United States Patent [19]

Keene et al.

[11] Patent Number: 4,902,125

[45] Date of Patent: Feb. 20, 1990

[54] OPTICAL SYSTEM HAVING BEAM AMPLIFICATION

[75] Inventors: Wayne H. Keene, South Natick; Albert V. Jelalian, Bedford, both of Mass.; David B. McVicker, Merrimack, N.H.

[73] Assignee: Raytheon Company, Lexington, Mass.

[21] Appl. No.: 213,816

[22] Filed: Jun. 30, 1988

[51] Int. Cl.⁴ ............................................. G01C 3/08
[52] U.S. Cl. ........................................ 356/4; 356/4.5
[58] Field of Search ................. 330/4.3; 356/5, 4, 4.5

[56] References Cited

U.S. PATENT DOCUMENTS

| | | |
|---|---|---|
| 3,360,987 | 1/1968 | Flower et al. . |
| 3,401,590 | 9/1968 | Massey ........................ 88/14 |
| 3,676,003 | 7/1972 | Naiman et al. ................ 356/5 |
| 3,811,774 | 5/1974 | Honeycutt et al. ............ 356/5 |
| 3,856,402 | 12/1974 | Low et al. . |
| 4,005,935 | 2/1977 | Wang . |
| 4,077,718 | 3/1978 | Graham, Jr. et al. . |
| 4,131,792 | 12/1978 | Schlossberg . |
| 4,167,329 | 9/1979 | Jelalian et al. . |
| 4,174,177 | 11/1979 | Gardner et al. . |
| 4,181,431 | 1/1980 | Chaborski . |
| 4,209,253 | 6/1980 | Hughes ...................... 356/152 |
| 4,211,485 | 7/1980 | Koreicho . |
| 4,311,384 | 1/1982 | Keene . |
| 4,391,515 | 7/1983 | Forrester et al. ............. 356/5 |
| 4,397,549 | 8/1983 | Morgan . |
| 4,413,905 | 11/1983 | Holzapfel ..................... 356/5 |
| 4,530,600 | 7/1985 | Lopez ......................... 356/5 |
| 4,537,502 | 8/1985 | Miller et al. . |
| 4,553,836 | 11/1985 | Meier et al. . |
| 4,643,575 | 2/1987 | Hazeltine et al. . |
| 4,662,741 | 5/1987 | Duvall, III et al. . |
| 4,717,252 | 1/1988 | Halldorsson et al. . |
| 4,766,393 | 8/1988 | Johnson ..................... 330/4.3 |

OTHER PUBLICATIONS

U.S. patent application Ser. No. 33,958, "Interferometer for Photoconductive Detectors," filed Apr. 3, 1987 (C. E. Harris, et al.).

Primary Examiner—Thomas H. Tarcza
Assistant Examiner—Mark Hellner
Attorney, Agent, or Firm—Christopher L. Maginniss; Richard M. Sharkansky

[57] ABSTRACT

A laser radar system having amplification of the optical beam. In a system where it is desired to achieve greater information content or greater system sensitivity, one or more laser amplifiers in the beam paths provide greater optical power for increased distance. Eleven system architectures are disclosed for use with a modified Mach-Zehnder interferometer, eleven are disclosed for use with a Fizeau interferometer, and three are disclosed for use in a noncoherent optical system. The embodiments are distinguished by the number and placement of the laser amplifiers in the optical paths of the system.

27 Claims, 11 Drawing Sheets

OPTICAL SYSTEM HAVING BEAM AMPLIFICATION

BACKGROUND OF THE INVENTION

The present invention relates generally to laser systems, and more particularly to interferometers for use with laser radar systems.

As is known in the art, interferometers are used in laser radar systems for determining the beat frequency between transmitted laser signals and target-reflected return signals to thereby determine such target parameters as range and Doppler speed. These interferometers are used in both homodyne and heterodyne laser radar systems. In a typical interferometer, a laser produces a linearly polarized (such as p-polarized) single (such as $TEM_{00}$) mode beam of electromagnetic energy which is directed through a polarization discriminator, such as a Brewster plate, which couples the p-polarized beam to a quarter-waveplate. The quarter-waveplate transforms the polarization of the beam to circular (such as right-circular) polarization. The circularly polarized laser beam is transmitted toward a target, a portion of the transmitted beam being reflected by the target and returned to the interferometer as an oppositely-circularly (such as left-circularly) polarized beam. The quarter-waveplate transforms the polarization of the return beam to linear polarization orthogonal to the linear polarization of the beam produced by the laser (e.g., to an s-polarized beam). The s-polarized beam is focused on a detecting surface of a detector element. In a homodyne interferometer, a portion of the p-polarized beam produced by the laser is deflected and the polarization thereof rotated (such as by a half-waveplate) to a polarization identical to the s-polarized target reflected return beam focused onto the detector, thereby providing an s-polarized local oscillator (L.O.) beam. The local oscillator beam is also focused on the detecting surface of the same detector element as the target-reflected return beam. The superimposed target-reflected return and L.O. beams are of identical linear polarization and have the same plane wavefronts. The local oscillator beam also has a Gaussian intensity distribution on the detector element, which is derived from the single mode $TEM_{00}$ output of the laser. The superimposed signals interfere on the detector element, with the detector element thereby producing a signal which can be processed to yield range and/or radial velocity of the target.

Range measurement using such an interferometer may be accomplished in a typical state-of-the-art $CO_2$ laser radar system by means of linear up and down frequency chirp combined with coherent detection of the return signal using a time-delayed sample of the chirped transmitter as the local oscillator. The chirp is generated by applying a voltage ramp to a piezoelectric transducer which carries one of the laser mirrors. The difference frequency between the local oscillator and signal beams depends on the range and velocity. Frequency measurements made on the upchirp and the downchirp are added and subtracted to yield the range and velocity. Other suitable modulation formats may also be used, including pulsed.

In such a system, the range resolution is dependent on the chirp rate and the dwell time. For a given piezoelectric transducer and driver with particular velocity vs. time characteristics, the chirp rate of the laser is inversely proportional to the separation of the laser mirrors. That is, chirp rate may be increased by using shorter lasers, which lasers provide a beam of lower output power. There is a need for higher performance $CO_2$ laser radar sensors for future systems. Both longer range and smaller range resolutions are desired which leads to higher laser power and wider bandwidth. The tradeoff between laser power and chirp rate by varying the laser length is therefore not appropriate for the system improvements needed.

SUMMARY OF THE INVENTION

In accordance with the principles of the present invention, there is disclosed an apparatus wherein a first portion of a beam of energy is transmitted along a first path to a target and a second portion of the beam is reflected to a detector along a common path with a target-reflected portion of the transmitted first beam portion returned to the apparatus. The apparatus comprises means for amplifying the optical energy of at least one of the first beam portion, the second beam portion and the target reflected portion.

In one set of embodiments including the present invention, there is disclosed a coherent laser radar system for transmitting an optical beam toward a target and for detecting the target reflected portion of the beam. The system includes a laser for producing a beam of optical energy along a first path, a beamsplitter in the first path for transmitting a first portion of the beam along the first path and for reflecting a second portion of the beam along a second path. The system also includes means in the first path for altering the polarization of the first portion of the beam transmitted toward the target, and for further altering the polarization of the target-reflected portion of the beam. The system additionally includes means in the first path responsive to the polarization of the first beam portion for transmitting the first beam portion therethrough, and responsive to the polarization of the target-reflected beam portion altered by the altering means for reflecting the target-reflected portion along a third path. The system further includes a beam combiner for providing a combined beam from the second beam portion and the target-reflected portion on the third path, and for directing the combined beam along a fourth path; and detector means responsive to the combined beam on the fourth path. Finally, the system includes means in at least one of said first and third paths for amplifying the optical energy in said at least one path.

In a second set of embodiments including the present invention, there is disclosed a coherent laser radar system for transmitting an optical beam toward a target and for detecting the target-reflected portion of the beam. The system includes local oscillator generating means in the first path, the generating means altering the polarization of an optical beam passing therethrough, the generating means additionally reflecting a portion of the beam from the laser. The system also includes means in the first path responsive to the polarization of the beam from the laser for transmitting the beam from the laser therethrough, and responsive to the polarization of the target-reflected beam altered by the generating means for reflecting the target-reflected portion along a second path, and responsive also to the polarization of the beam portion reflected by the generating means for reflecting the target-reflected beam portion along the second path. The system further includes detector means responsive to the beam on the second path, and means in at least one of the first and second paths for amplifying the optical energy in the at least one path.

In a third set of embodiments, there is disclosed an apparatus for use in a noncoherent laser radar system. In this system, a beam of optical energy is transmitted along a first path to a target and reflected therefrom along the first path, the target-reflected portion of the transmitted beam being directed onto a second path to a detector. The apparatus comprises means for amplifying the optical energy of at least one of the target-reflected beam portion on the first path and the beam on the second path.

With such arrangement, a shorter laser, providing greater information content, and therefore improved range resolution, may be included in a laser radar system having higher laser power, and therefore greater range detection.

DESCRIPTION OF THE PREFERRED EMBODIMENT

Figure 1:
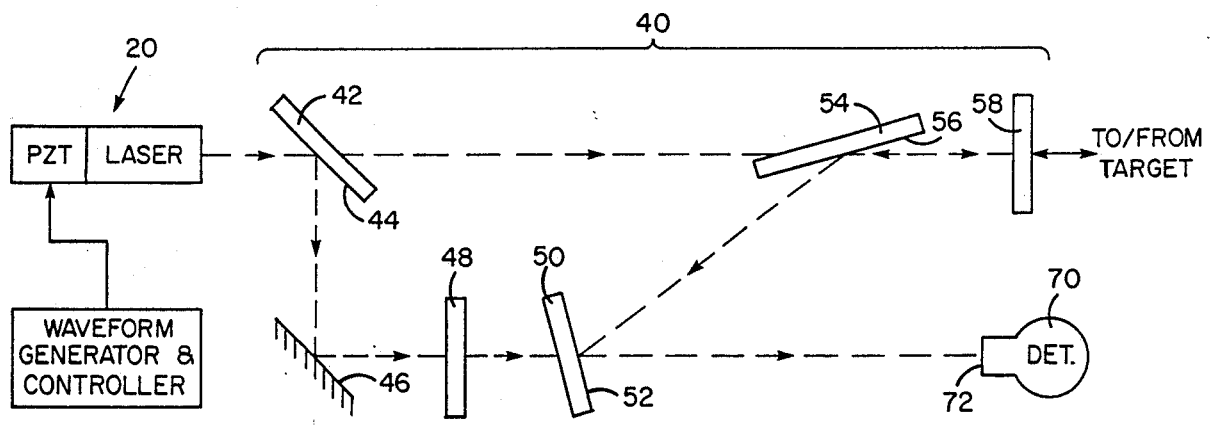
FIG. 1 illustrates a portion of a laser radar system including a modified Mach-Zehnder interferometer.

Referring now to FIG. 1, there is shown a portion of a radar system including a laser 20 for producing a coherent beam of electromagnetic energy which is then transmitted through interferometer 40. Laser 20 comprises any known type of laser which will meet the requirements of the required application, and here, for a selected wavelength in the infrared range, a preferred type is a $CO_2$ laser producing a diffraction limited beam at a nominal operating frequency corresponding to the 10.6 microns transition. A portion of the generated laser beam is reflected by interferometer 40 and is used as the local oscillator beam.

The portion of the transmitted beam that is reflected by a target present in the field of view is returned through interferometer 40 and is then directed to homodyne detector 70. Detector 70 is used to mix or homodyne the return signals with the local oscillator signal which is derived from a portion of the instantaneous transmitted beam. Detector 70 may be a mercury cadmium telluride (HgCdTe) photovoltaic detector. The output of detector 70 is a homodyned signal having as a frequency component thereof a beam frequency equal to the difference in the frequencies of the transmitted signal and the return signal. The homodyned signal is processed by a receiver (not shown) to filter out and amplify the beat frequency signal to thereby detect target range and Doppler speed.

The beam from laser 20 is transmitted through beamsplitter 42, where a small portion is reflected to be used as the local oscillator beam. The transmitted portion of the beam is directed through a Brewster angle polarizer 54 to quarter-waveplate 58, to change the polarization of the p-polarized beam to left-circular polarization. The left-circularly polarized beam is now transmitted through the rest of the optical system (not shown) for transmission to targets in the field of view, as described hereinabove. Upon reflection from targets, the polarization of the reflected beam has been mainly changed to right-circular polarization. A portion of the reflected beam is then collected by the optical system, and the right-circular polarization of the collected beam is changed to linear by its transmission through quarter-waveplate 58. The linear polarization is now perpendicular to the plane of incidence of the beam and the beam is referred to as being s-polarized. The received s-polarized beam is now reflected by surface 56 of Brewster angle polarizer 54 toward beam combiner 50, where it is reflected from surface 52 toward detector 70.

The portion of the beam reflected from surface 44 of beamsplitter 42, that is, the local oscillator beam, is directed by mirrored surface 46 through half-waveplate 48, which is used to rotate the plane of polarization of the p-polarized reference beam to match the s-polarization of the target reflected return beam. The polarization-corrected local oscillator beam is now combined with the return beam by beam combiner 50 and the optically combined beam may be focused by a lens (not shown) onto the light sensitive surface 72 of detector 70.

Figure 2:
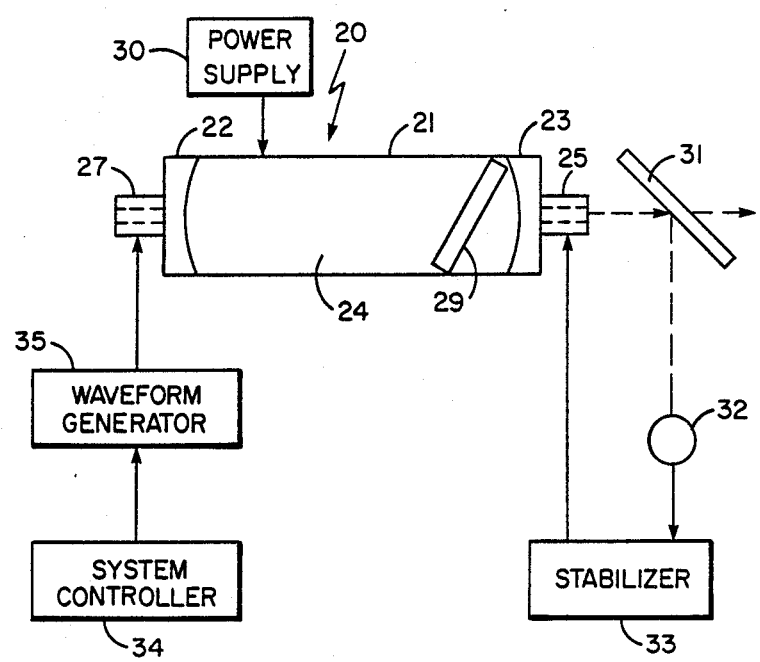
FIG. 2 illustrates in greater detail the laser of the FIG. 1 system.

Referring now to FIG. 2, laser 20 is shown in more detail. Laser 20 comprises an envelope 21, mirror 22 and partially transmitting output mirror 23 which form the optical resonant cavity including a suitable gain medium 24. Output mirror 23 is mounted on a hollow cylindrical piezoelectric stack 25 which is used to accurately position mirror 23. A CW laser beam is generated by the pumping means of laser 20, not shown in FIG. 2, which in the case of a CW $CO_2$ laser may comprise a longitudinal discharge electrodes connected to a power supply 30, as is well known in the art. In the present application, power supply 30 is preferably a DC voltage source, but an RF power supply may also be used to power laser 20. The laser beam thus generated is linearly polarized (p-polarized by this example) by a Brewster angle polarizer 29.

The first portion of the laser beam from laser 20 which is reflected by beamsplitter 31 is directed toward detector 32. The electrical signal produced by detector 32 is then coupled to stabilizer 33 to maintain the frequency stability of laser 20 by controlling the position of mirror 23 with piezoelectric stack 25 and thereby adjust for any change in the optical length. Stabilizer 33 superimposes an AC signal, typically having a frequency of 1 kHz, on the DC positioning signal normally applied to stack 25 in order to scan about the center of the selected laser transition and generate an error signal to control the DC positioning signal applied to PZT stack 25. This is done periodically during operation of the system to maintain laser 20 at the center of the selected transition. A commercially available unit, a Lansing Research Company Model 80214, may be used as stabilizer 33.

The output beam of laser 20 is frequency modulated by systematically sweeping the resonant frequency of the cavity, here effected by changing the optical length.

A frequency modulation corresponding to a symmetrical ramp is accomplished by cyclically oscillating mirror 22 about its stabilized position for a given laser transition. System controller 34 controls waveform generator 35 to provide piezoelectric stack 27 with a driving signal corresponding to a triangular waveform of the selected amplitude and period. This forces the resonant frequency of the cavity to be scanned through a fraction of the free spectral range for the laser used. Other frequency modulation means may be employed, such as an electro-optic crystal inside the laser cavity. System controller 34 controls the modulation period of waveform generator 35.

Figure 3:
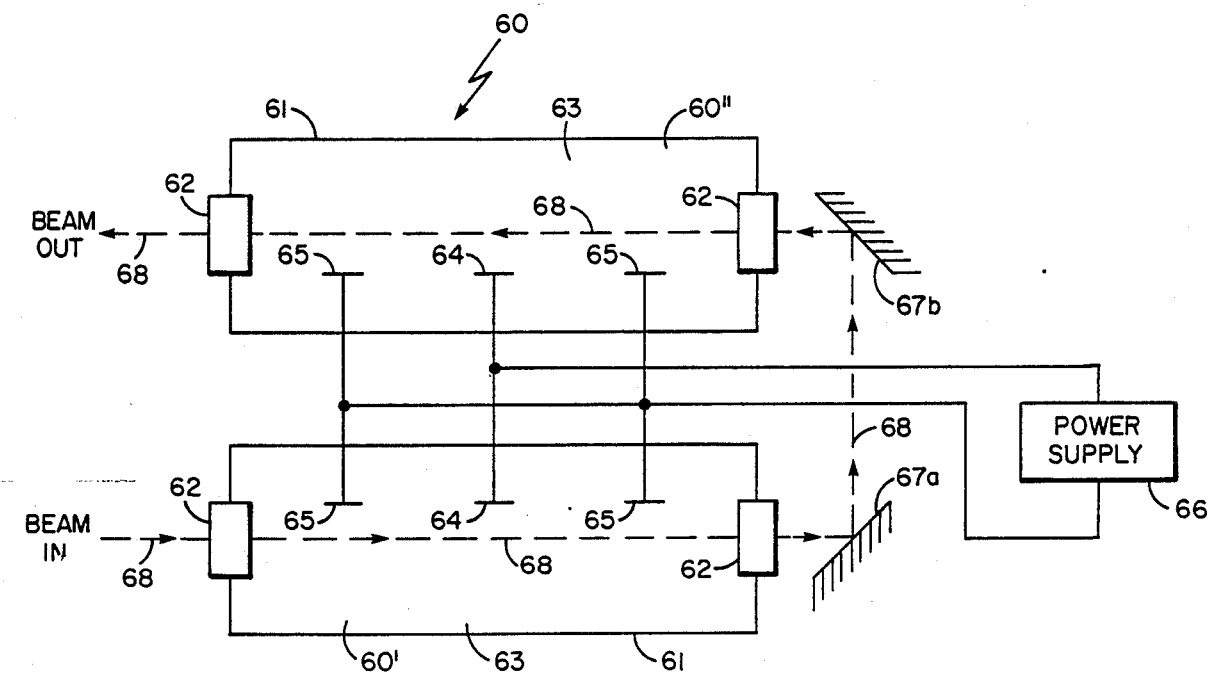
FIG. 3 illustrates a laser amplifier for use in a laser radar system including the present invention.

In accordance with the present invention, one or more nonresonant $CO_2$ laser amplifiers are positioned in selected optical paths of the interferometer, as will be described with more particularity below. A nonresonant $CO_2$ laser amplifier is depicted with some amount of detail in FIG. 3. Laser amplifier 60 may comprise a single laser tube, or two or more laser tubes in cascade configuration. For ease of understanding, two laser tubes 60' and 60" are illustrated by FIG. 3, although, in a preferred embodiment, eight tubes comprise the laser amplifier. Each laser tube 60', 60" includes an envelope 61 and optical windows 62 on each end of the tube, which form the optical path including a suitable gain medium 63. The laser electrodes, illustrated as anodes 64 and cathodes 65 are coupled to a power supply 66. In the present application, power supply 66 is preferably a DC voltage source, but it will be recognized by those skilled in the art that an RF power supply may be used, and that the configuration of electrodes 64, 65 may be such that longitudinal or transverse discharge is produced. An optical beam 68, directed as shown by the arrows into the lower tube 60', is reflected from mirrored surfaces 67a, 67b into laser tube 60". The optical energy of beam 68 is amplified by each traversal through a laser tube 60', 60". Laser amplifiers are well known in the art, and are described in greater detail in U.S. Pat. No. 3,856,402, "Clear Air Turbulence Detector," issued Dec. 24, 1974, to G.M. Low et al.

Referring to FIGS. 4–14, there are shown eleven embodiments of the present invention as they may be included within the structure of a modified Mach-Zehnder interferometer. In each of these eleven embodiments, the main beam from laser 20 is amplified at least once before it is recombined with the local oscillator beam. It will be observed that the laser amplifiers 60a, 60b and 60c, as shown in FIGS. 4–14, are of the type shown as laser amplifier 60 in FIG. 3. Laser amplifier 60c may have anti-reflective coatings on its windows so as to pass any polarization of the optical beam.

Figure 4:
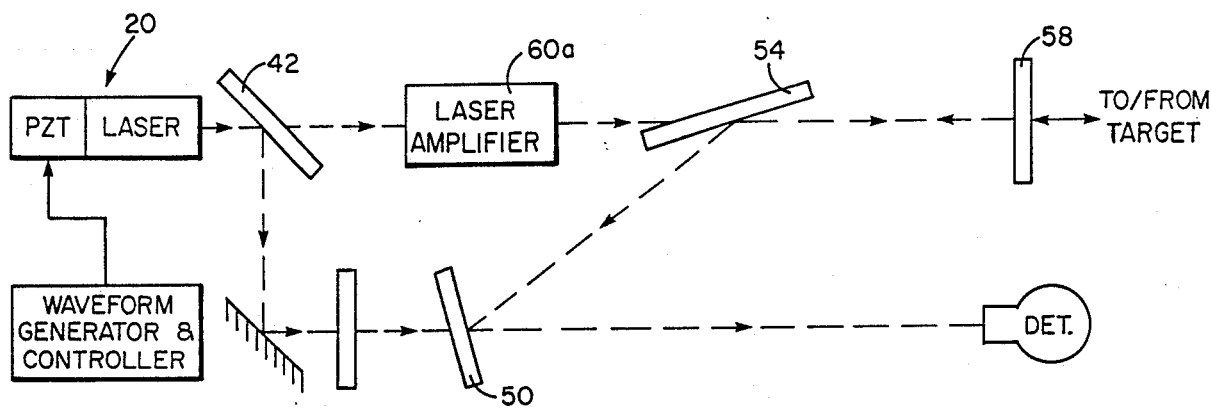
FIGS. 4-14 illustrate embodiments of the present invention included within the structural configuration of a modified Mach-Zehnder interferometer.

In the FIG. 4 embodiment, amplification of the main beam transmitted from laser 20 toward a target is provided by laser amplifier 60a, located in the optical path between beamsplitter 42 and Brewster angle polarizer 54.

Figure 5:
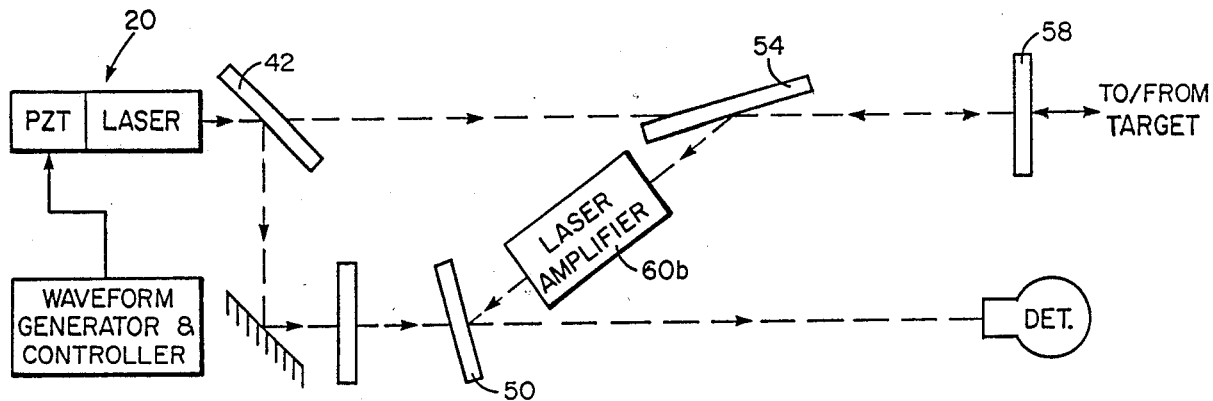

In the FIG. 5 embodiment, amplification of the return beam reflected from a target is provided by laser amplifier 60b, located in the optical path between Brewster angle polarizer 54 and beam combiner 50.

Figure 6:
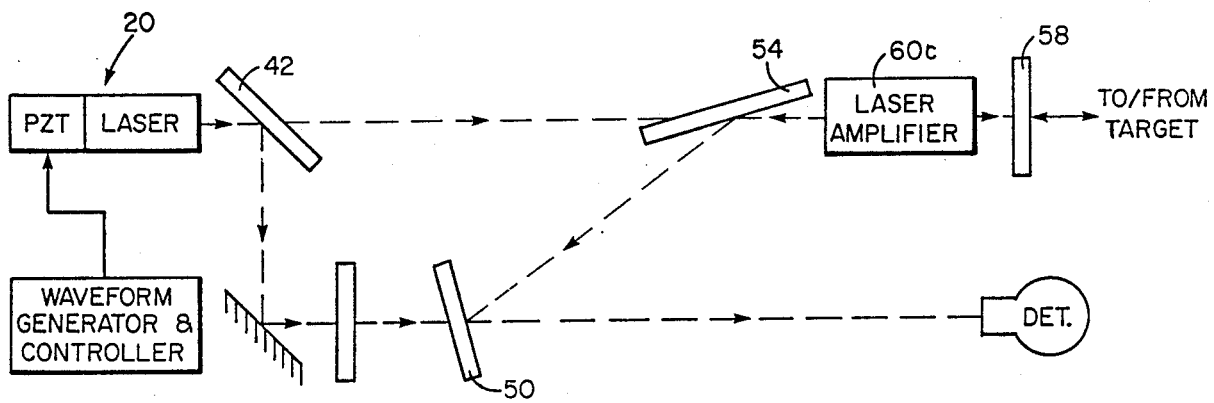
Figure 11:
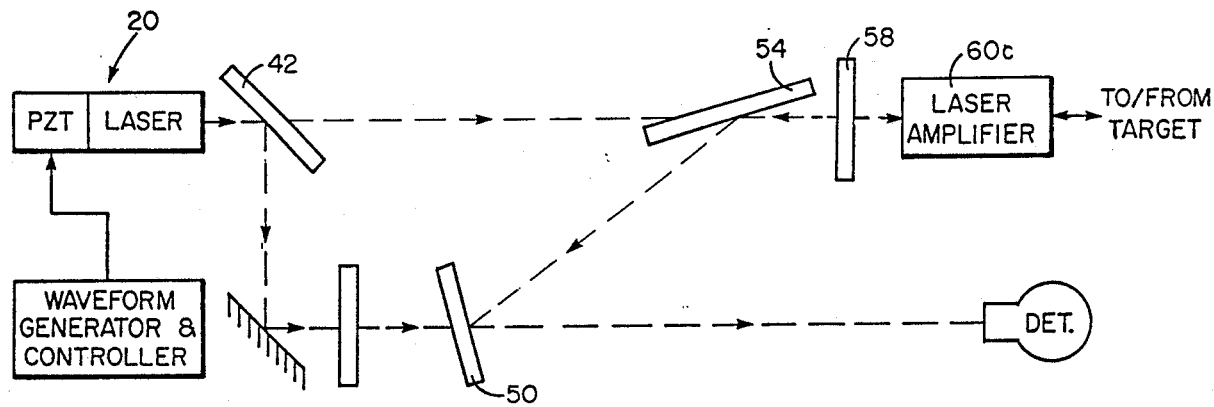

In the FIG. 6 embodiment, amplification of both the main beam transmitted from laser 20 toward a target and the return beam reflected from a target is provided by laser amplifier 60c, located in the optical path between Brewster angle polarizer 54 and quarter-waveplate 58. The embodiment of FIG. 11 is similar to the FIG. 6 embodiment, but with laser amplifier 60c between quarter-waveplate 58 and the target, rather than between Brewster angle polarizer 54 and quarter-waveplate 58.

Figure 7:
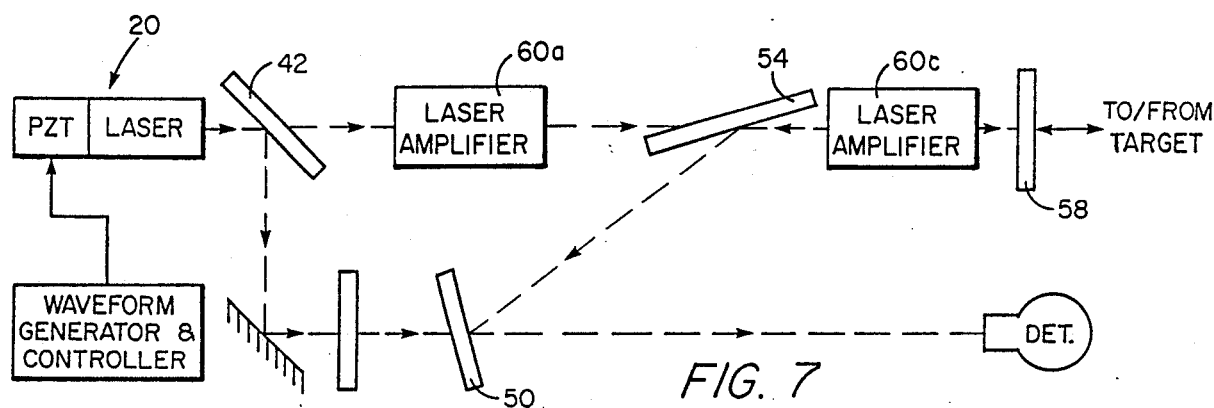
Figure 12:
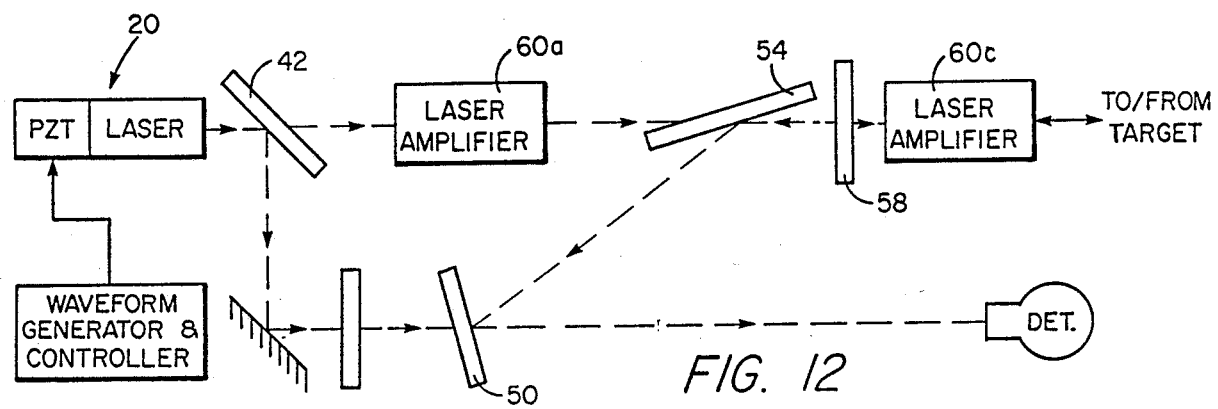

In the FIG. 7 embodiment, amplification of the main beam transmitted from laser 20 toward a target is provided by laser amplifier 60a, located in the optical path between beamsplitter 42 and Brewster angle polarizer 54, and by laser amplifier 60c, located in the optical path between Brewster angle polarizer 54 and quarter-waveplate 58. Amplification of the return beam reflected from a target is provided by laser amplifier 60c. The embodiment of FIG. 12 is similar to the FIG. 7 embodiment, but with laser amplifier 60c between quarter-waveplate 58 and the target, rather than between Brewster angle polarizer 54 and quarter-waveplate 58.

Figure 8:
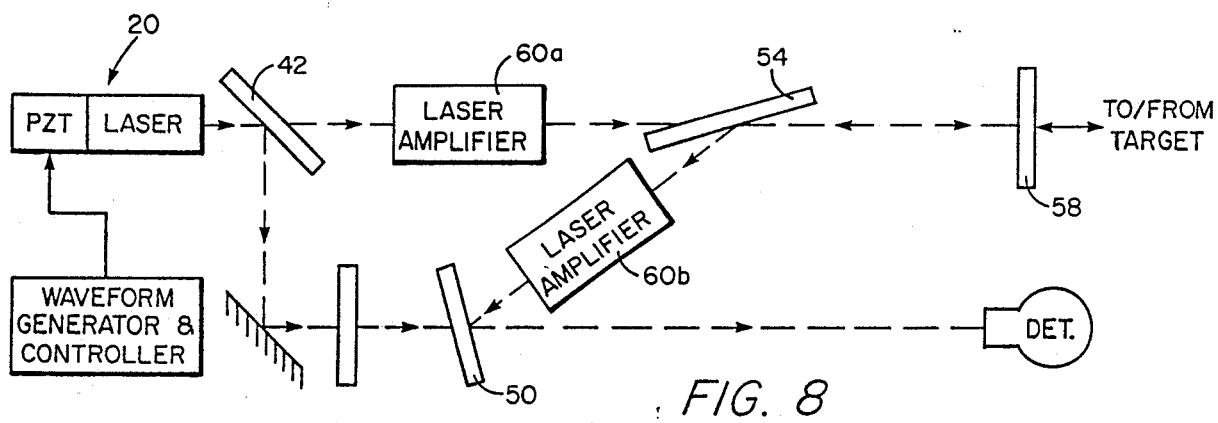

In the FIG. 8 embodiment, amplification of the main beam transmitted from laser 20 toward a target is provided by laser amplifier 60a, located in the optical path between beamsplitter 42 and Brewster angle polarizer 54. Amplification of the return beam reflected from a target is provided by laser amplifier 60b, located in the optical path between Brewster angle polarizer 54 and beam combiner 50.

Figure 9:
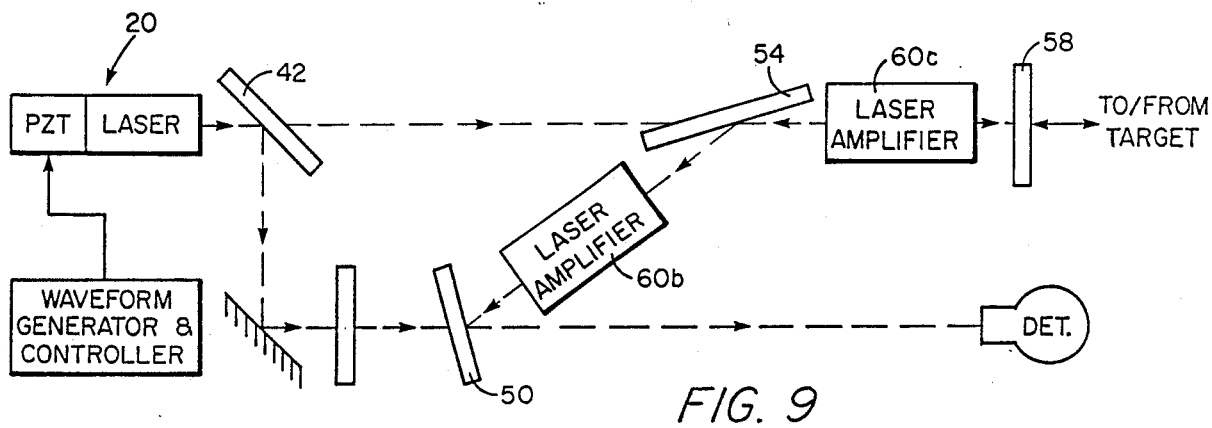
Figure 13:
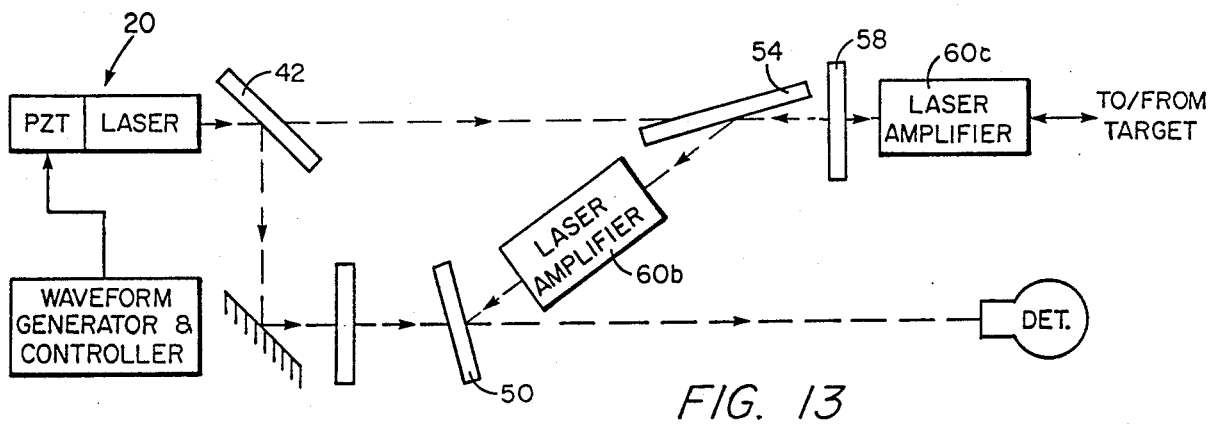

In the FIG. 9 embodiment, amplification of the main beam transmitted from laser 20 toward a target is provided by laser amplifier 60c, located in the optical path between Brewster angle polarizer 54 and quarter-waveplate 58. Amplification of the return beam reflected from a target is provided by laser amplifier 60c, and by laser amplifier 60b, located in the optical path between Brewster angle polarizer 54 and beam combiner 50. The embodiment of FIG. 13 is similar to the FIG. 9 embodiment, but with laser amplifier 60c between quarter-waveplate 58 and the target, rather than between Brewster angle polarizer 54 and quarter-waveplate 58.

Figure 10:
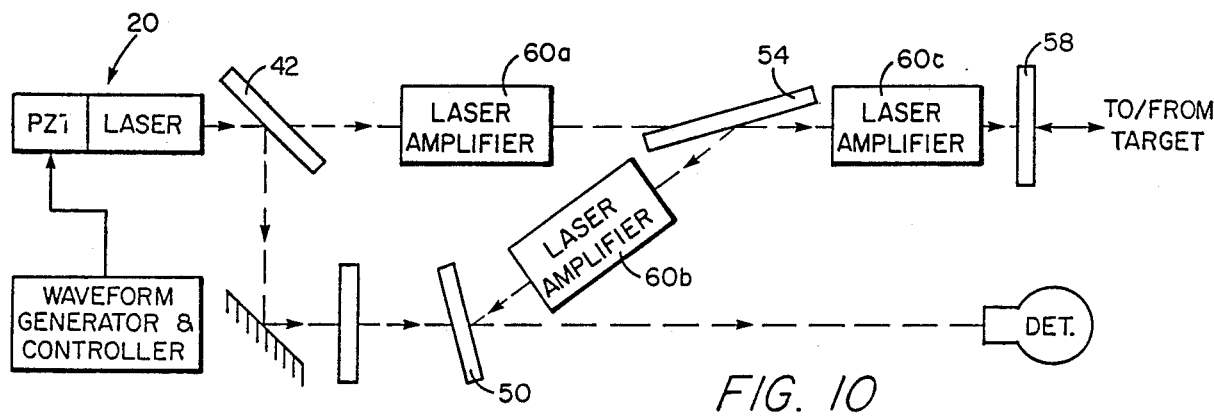
Figure 14:
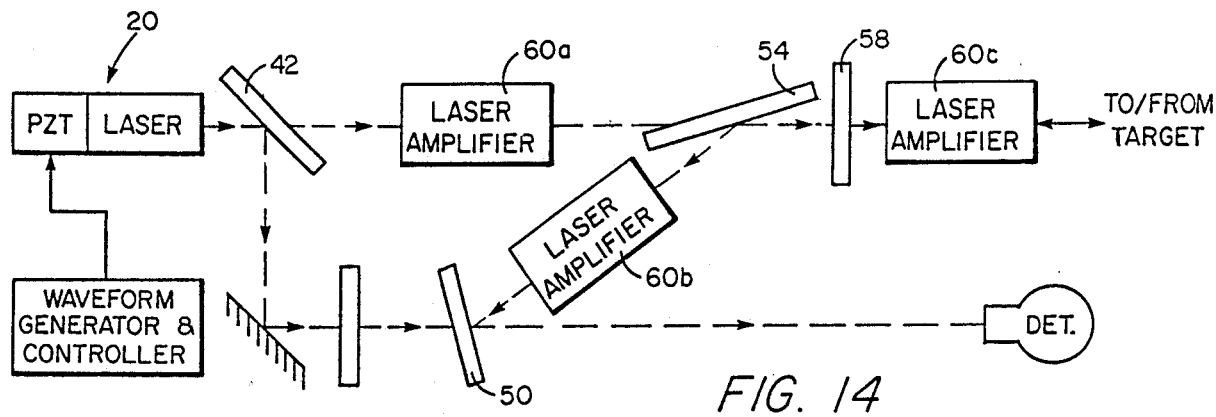

In the FIG. 10 embodiment, amplification of the main beam transmitted from laser 20 toward a target is provided by laser amplifier 60a, located in the optical path between beamsplitter 42 and Brewster angle polarizer 54, and by laser amplifier 60c, located in the optical path between Brewster angle polarizer 54 and quarter-waveplate 58. Amplification of the return beam reflected from a target is provided by laser amplifier 60c, and by laser amplifier 60b, located in the optical path between Brewster angle polarizer 54 and beam combiner 50. The embodiment of FIG. 14 is similar to the FIG. 10 embodiment, but with laser amplifier 60c between quarter-waveplate 58 and the target, rather than between Brewster angle polarizer 54 and quarter-waveplate 58.

Figure 15:
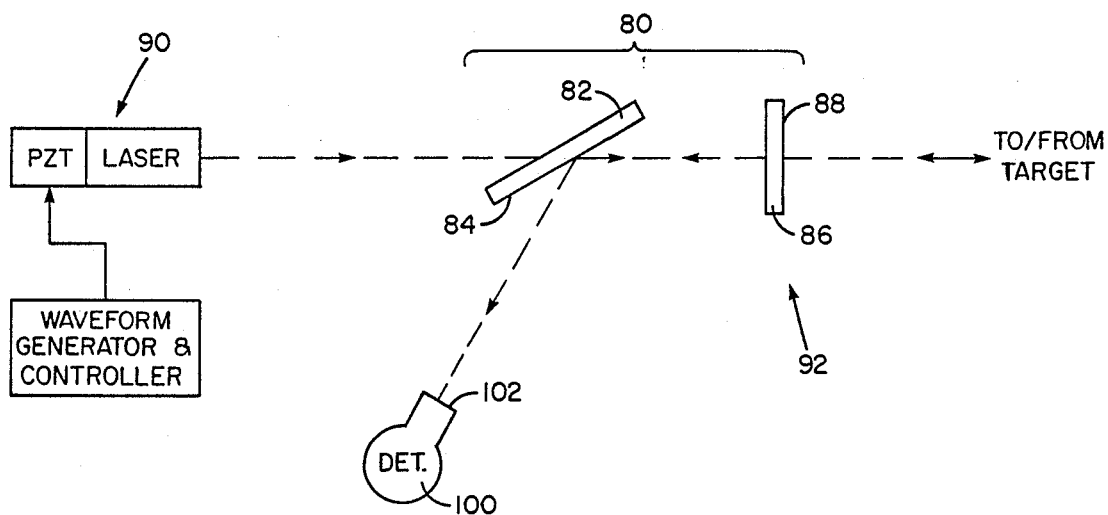
FIG. 15 illustrates a portion of a laser radar system including a Fizeau interferometer.

Referring to FIG. 15, there is shown a block diagram of a laser radar system including a Fizeau interferometer 80. Laser 90 provides the laser light used to form the optical beam for the system, and may typically be identical to laser 20 illustrated in FIG. 2. The linearly polarized chirped beam from laser 90 propagates through a polarizing beamsplitter 82 to a local oscillator generator 92. In a rudimentary Fizeau interferometer, the local oscillator generator may comprise a quarter-waveplate and a beamsplitter as separate optical devices. In the example as illustrated in FIG. 15, however, local oscillator generator 92 comprises a quarter-waveplate 86 having a surface 88 treated so as to act as a low-reflectance beam splitter, and thereby provide a slight degree of reflection to a beam transmitted from laser 90. A small portion of the laser beam is reflected from surface 88 and reflects back toward polarizing beamsplitter 82. This beam has orthogonal linear polarization, by virtue of its two traversals of quarter-waveplate 86, and is therefore reflected by surface 84 of polarizing beamsplitter 82, and is directed toward sensitive surface 102 of detector 100, where it may be used as a local oscillator beam.

The majority of the beam from laser 90 transmits through local oscillator generator 92 and emerges as a circularly polarized beam which propagates toward a target. A portion of the beam scatters from the target, propagates back to the system and again traverses local oscillator generator 92, where its polarization is converted to orthogonal linear. This beam reflects from surface 84 of polarizing beamsplitter 82, and combines with the local oscillator beam so that coherent detection may be effected.

Referring to FIGS. 16–26, there are shown eleven embodiments of the present invention as they may be included within the structure of a Fizeau interferometer of the type illustrated in FIG. 15. In each of these eleven embodiments, the optical beam from laser 90 is amplified at least once before it impinges on the sensitive surface 102 of detector 100. It will be observed that the laser amplifiers 60d, 60e and 60f, as shown in FIGS. 16–26, are of the type shown as laser amplifier 60 in FIG. 3. Laser amplifier 60e may have anti-reflective coatings on its windows so as to pass any polarization of the optical beam.

Figure 16:
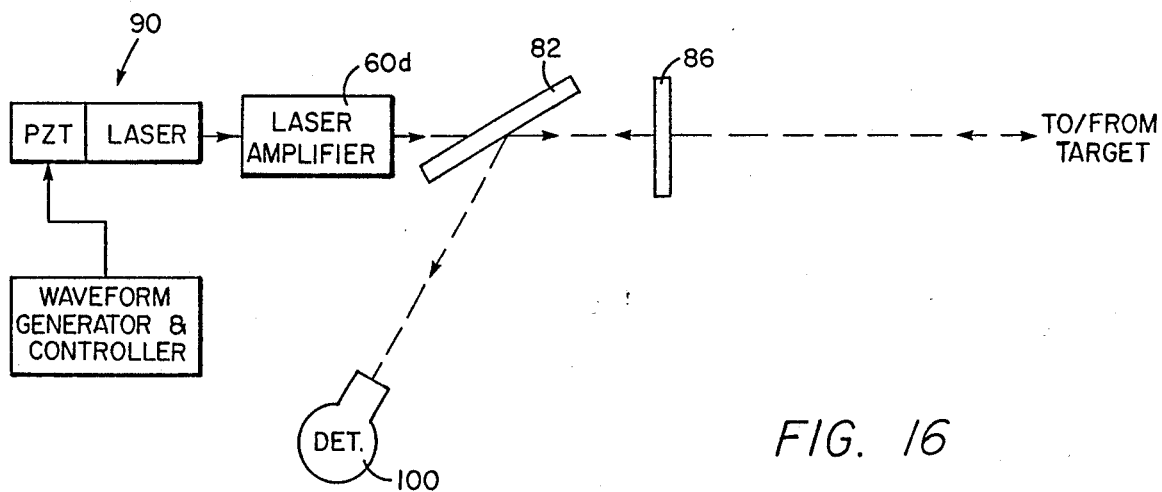
FIGS. 16-26 illustrate embodiments of the present invention included within the structural configuration of a Fizeau interferometer.

In the FIG. 16 embodiment, amplification of the entire beam transmitted from laser 90, including the portion directed toward a target and the portion used as the local oscillator, is provided by laser amplifier 60d, located in the optical path between laser 90 and polarizing beamsplitter 82.

Figure 17:
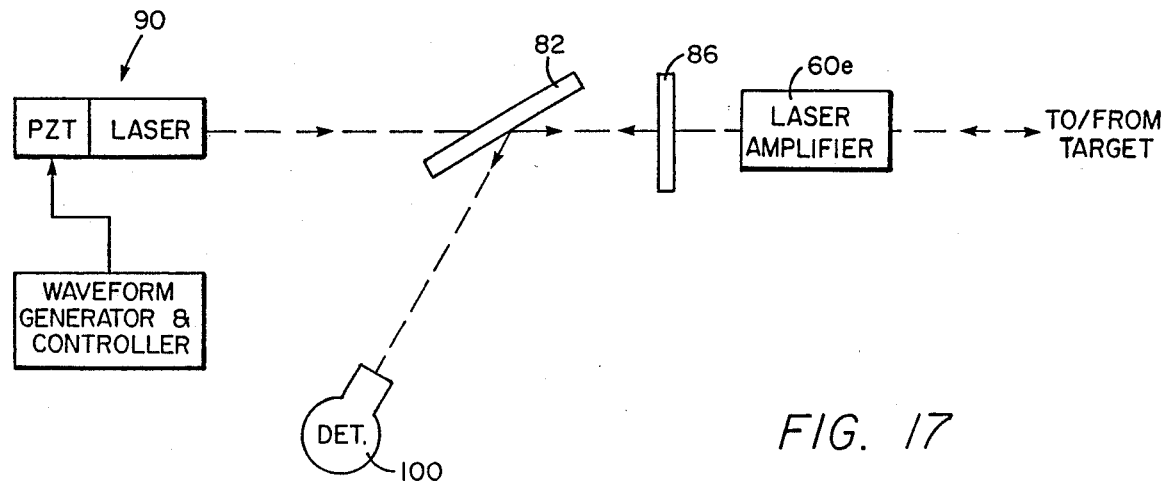
Figure 23:
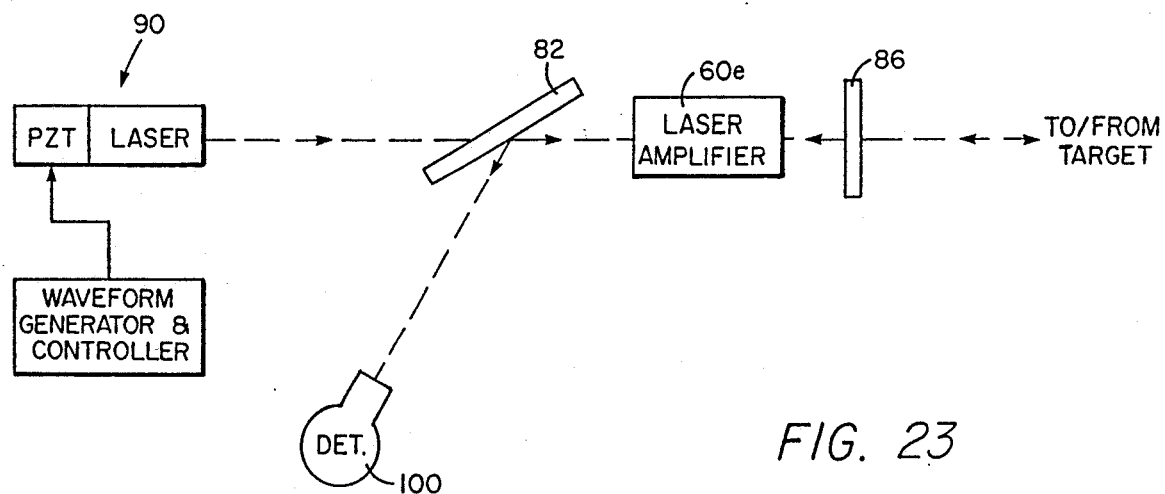

In the FIG. 17 embodiment, amplification of the portion of the beam from laser 90 transmitted toward a target and the return beam reflected from a target is provided by laser amplifier 60e, located in the optical path between quarter-waveplate 86 and a target. The embodiment of FIG. 23 is similar to the FIG. 17 embodiment, but with laser amplifier 60e between polarizing beamsplitter 82 and quarter-waveplate 86, rather than on the target side of quarter-waveplate 86.

Figure 18:
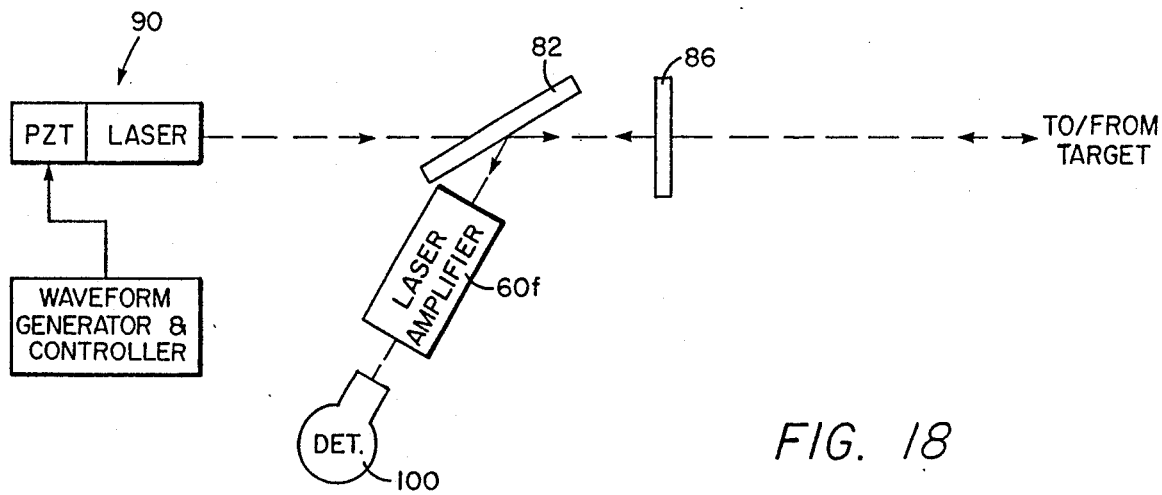

In the FIG. 18 embodiment, amplification of the return beam reflected from a target and the local oscillator beam is provided by laser amplifier 60f, located in the optical path between polarizing beamsplitter 82 and detector 100.

Figure 19:
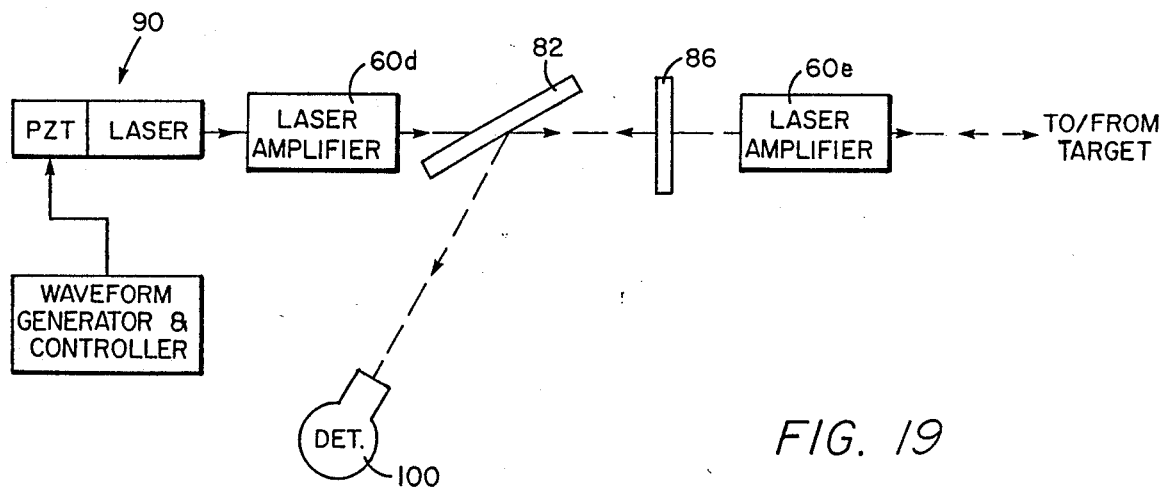
Figure 24:
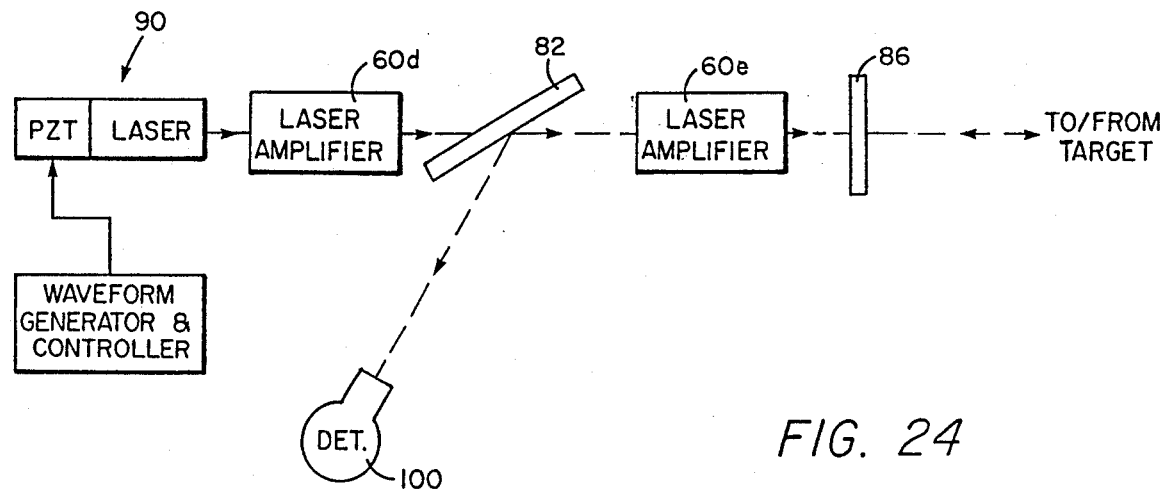

In the FIG. 19 embodiment, amplification of the beam transmitted from laser 90 toward a target is provided by laser amplifier 60d, located in the optical path between laser 90 and polarizing beamsplitter 82, and by laser amplifier 60e, located in optical path between quarter-waveplate 86 and a target. Amplification of the return beam reflected from a target is provided by laser amplifier 60e. Amplification of the portion of the beam transmitted by laser 90 used as the local oscillator is provided by laser amplifier 60d. The embodiment of FIG. 24 is similar to the FIG. 19 embodiment, but with laser amplifier 60e between polarizing beamsplitter 82 and quarter-waveplate 86, rather than on the target side of quarter-waveplate 86.

Figure 20:
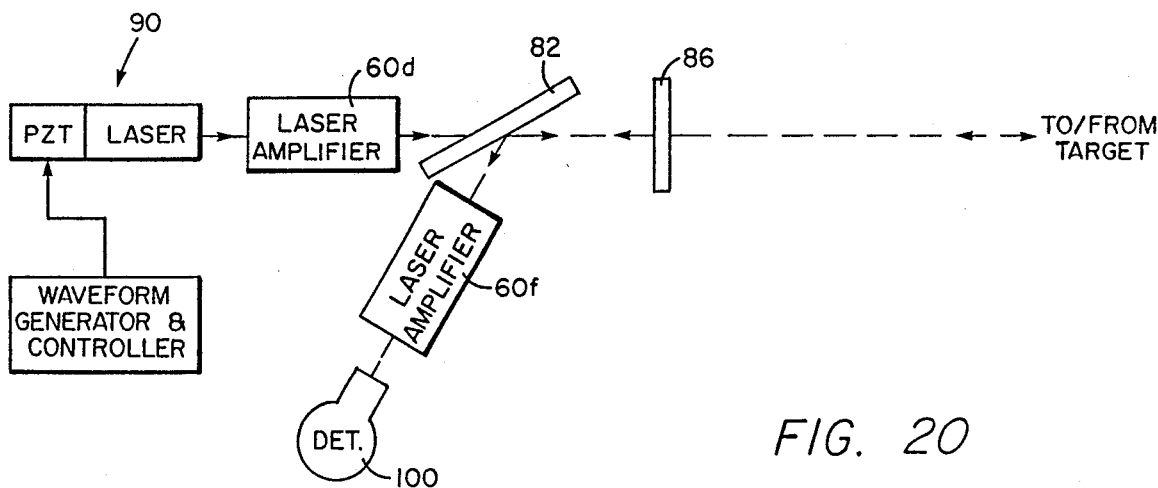

In the FIG. 20 embodiment, amplification of the beam transmitted from laser 90 toward a target is provided by laser amplifier 60d, located in the optical path between laser 90 and polarizing beamsplitter 82. Amplification of the return beam reflected from a target is provided by laser amplifier 60f, located in the optical path between polarizing beamsplitter 82 and detector 100. Amplification of the beam used as the local oscillator is provided by laser amplifiers 60d and 60f.

Figure 21:
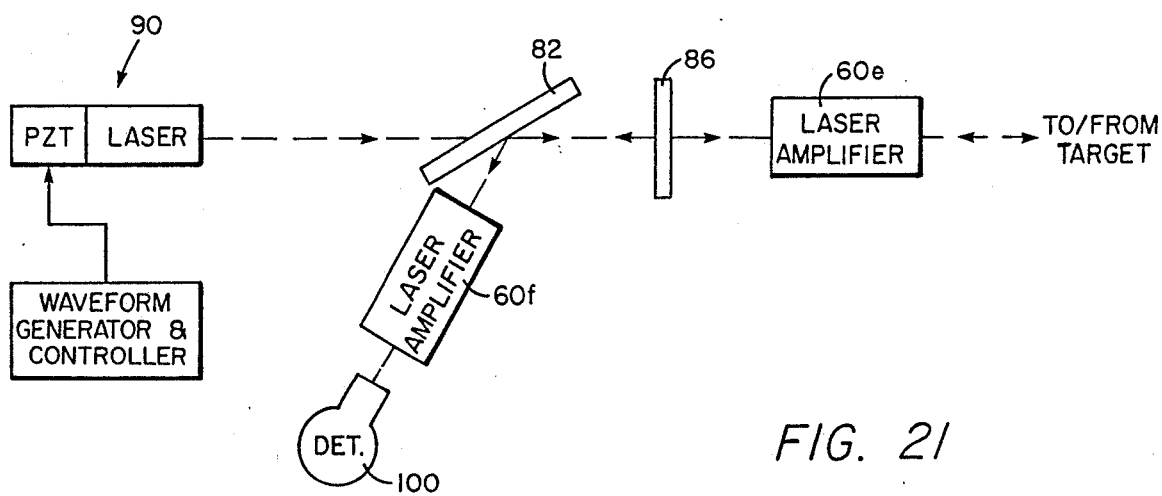
Figure 25:
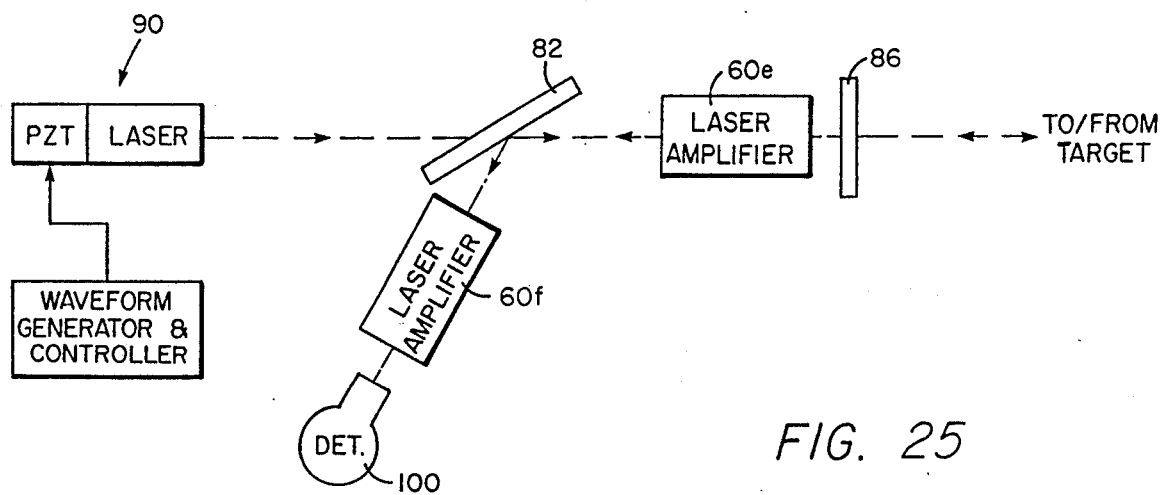

In the FIG. 21 embodiment, amplification of the beam transmitted from laser 90 toward a target is provided by laser amplifier 60e, located in the optical path between quarter-waveplate 86 and a target. Amplification of the return beam reflected from a target is provided by laser amplifier 60e and by laser amplifier 60f, located in the optical path between polarizing beamsplitter 82 and detector 100. Amplification of the beam used as the local oscillator is provided by laser amplifier 60f. The embodiment of FIG. 25 is similar to the FIG. 21 embodiment, but with laser amplifier 60e between polarizing beamsplitter 82 and quarter-waveplate 86, rather than on the target side of quarter-waveplate 86.

Figure 22:
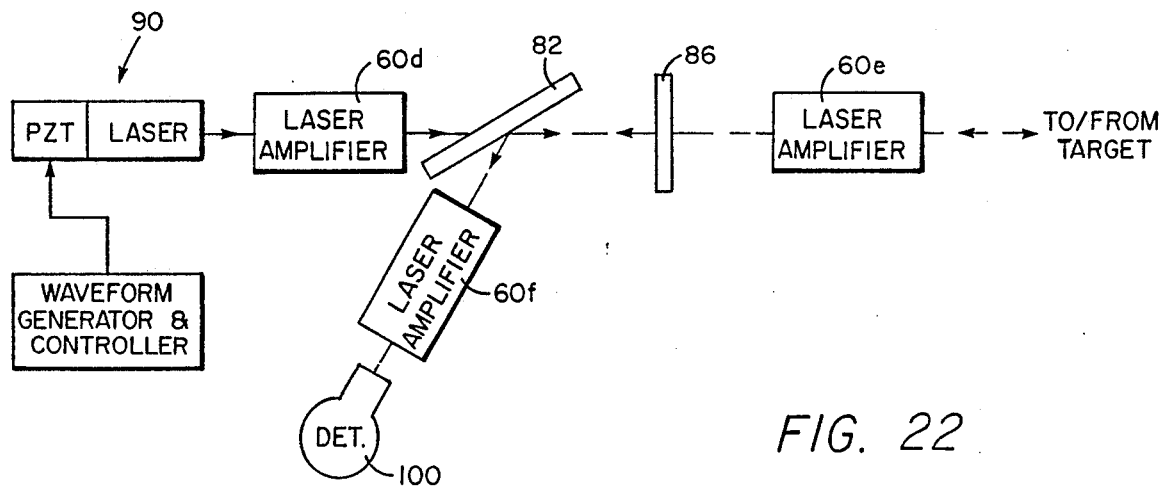
Figure 26:
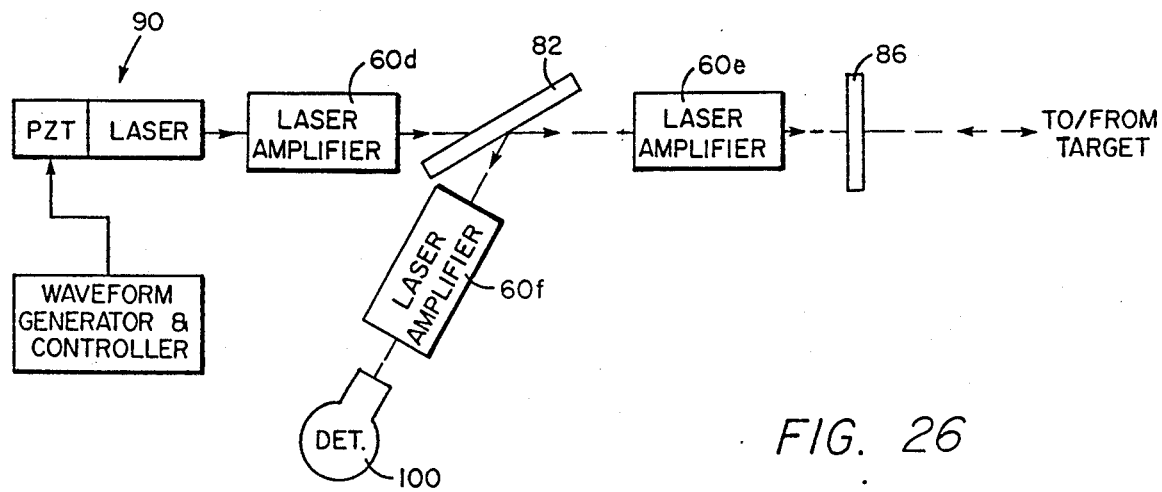

In the FIG. 22 embodiment, amplification of the beam transmitted from laser 90 toward a target is provided by laser amplifier 60d, located in the optical path between laser 90 and polarizing beamsplitter 82, and by laser amplifier 60e, located in the optical path between quarter-waveplate 86 and a target. Amplification of the return beam reflected from a target is provided by laser amplifier 60e and by laser amplifier 60f, located in the optical path between polarizing beamsplitter 82 and detector 100. Amplification of the beam used as the local oscillator is provided by laser amplifiers 60d and 60f. The embodiment of FIG. 26 is similar to the FIG. 22 embodiment, but with laser amplifier 60e between polarizing beamsplitter 82 and quarter-waveplate 86, rather than on the target side of quarter-waveplate 86.

Figure 27:
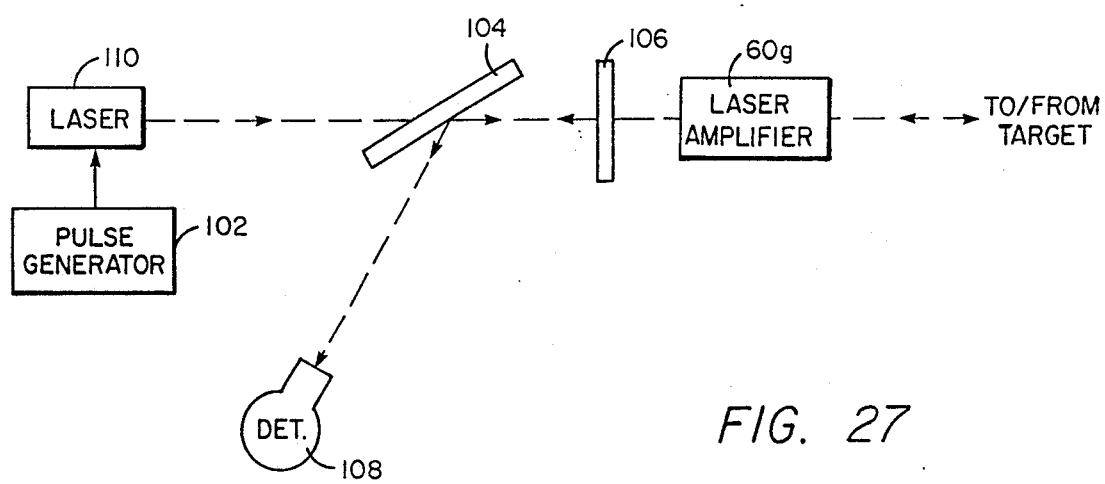
FIGS. 27-29 illustrate embodiments of the present invention included within the structural configuration of a non-coherent optical system.
Figure 28:
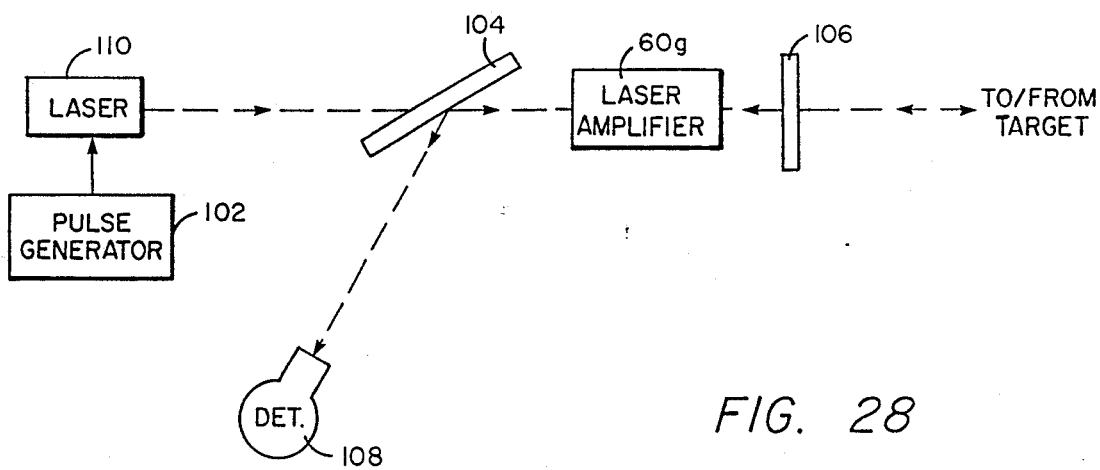
Figure 29:
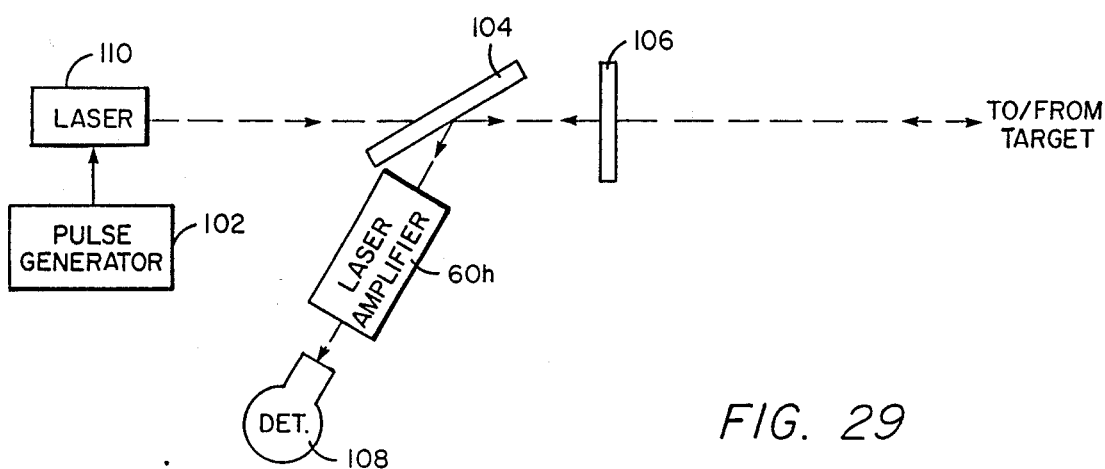

Referring now to FIGS. 27–29, there is shown in block diagram form the present invention embodied in a noncoherent optical system. Laser 110 is operated in a pulsed mode in response to electrical signals from pulse generator 102. The optical beam transmitted from laser 110 passes through Brewster angle polarizer 104 to quarter-waveplate 106, in which the beam polarization may illustratively be changed from p-polarization to left-circular polarization. Upon reflection from targets, the polarization of the reflected beam in this example will be changed to right-circular polarization. A portion of the reflected beam is then collected by the optical system, and the right-circular polarization of the collected beam is changed to linear by its transmission through quarter-waveplate 106, and the beam is referred to as being s-polarized. The received s-polarized beam is now reflected by Brewster angle polarizer 104 toward detector 108. In each of the three embodiments of FIGS. 27–29, the optical energy of the target-reflected beam is amplified by a laser amplifier, which may be similar to the type shown as laser amplifier 60 in FIG. 3.

In the FIG. 27 embodiment, amplification of both the main beam transmitted from laser 110 toward a target and the return beam reflected from a target is provided by laser amplifier 60g, located in the optical path between quarter-waveplate 106 and a target.

In the FIG. 28 embodiment, amplification of both the main beam transmitted from laser 110 toward a target and the return beam reflected from a target is provided by laser amplifier 60g, located in the optical path between Brewster angle polarizer 54 and quarter-waveplate 106.

In the FIG. 29 embodiment, amplification of the return beam reflected from a target is provided by laser amplifier 60h, located in the optical path between Brewster angle polarizer 104 and detector 108.

One skilled in the art will recognize that the embodiments of FIGS. 27–29 may also be implemented in a system which does not include polarization alteration. That is, if device 104 is a partially-reflective beamsplitter, quarter-waveplate 106 may be eliminated, and a simpler, but less efficient, noncoherent optical system is provided thereby.

While the principles of the present invention have been demonstrated with particular regard to the illustrated structure of the figures, it will be recognized that various departures from such illustrative structure may be undertaken in practice of the invention. As one example, it will be recognized that the embodiments of FIGS. 4–14 may be operated in a coherent mode but without the polarization altering devices 48 and 58 (as shown in FIG. 1), and wherein device 54 is a partially-reflective beamsplitter. As a further example, while the foregoing description has disclosed a system including a photovoltaic detector, which detector typically requires cooling in liquid nitrogen, it is easily seen that the optical system of the present invention may be modified according to the teachings of U.S. patent application Ser. No. 033,958, "Interferometer for Photoconductive Detectors," filed Apr. 3, 1987, for C.E. Harris and W.H. Keene, and assigned to the same assignee as the present invention, which application discloses interferometers suitable for use with thermoelectrically cooled, photoconductive detectors. The scope of the invention is therefore not intended to be limited to the structure disclosed herein but should instead be gauged by the breadth of the claims which follow.

What is claimed is:

1. A laser radar system for transmitting an optical beam toward a target and for detecting the target-reflected portion of said beam, said system including:
    a laser for producing a beam of optical energy along a first path;
    a beamsplitter in said first path for transmitting a first portion of said beam along said first path and for reflecting a second portion of said beam along a second path;
    means in said first path for altering the polarization of said first portion of said beam transmitted toward said target, and for further altering the polarization of said target-reflected portion of said beam;
    means in said first path responsive to the polarization of said first beam portion for transmitting said first beam portion therethrough, and responsive to the polarization of said target-reflected beam portion altered by said altering means for reflecting said target-reflected portion along a third path;
    a beam combiner for providing a combined beam from said second beam portion and said target-reflected portion on said third path, and for directing said combined beam along a fourth path;
    detector means responsive to said combined beam on said fourth path; and
    means in at least one of said first and third paths for amplifying the optical energy in said at least one path.

2. The system according to claim 1 wherein said amplifying means comprises a laser amplifier in the optical path between said beamsplitter and said means responsive to beam polarization.

3. The system according to claim 1 wherein said amplifying means comprises a laser amplifier in the optical path between said means responsive to beam polarization and said beam combiner.

4. The system according to claim 1 wherein said amplifying means comprises a laser amplifier in the optical path between said means responsive to beam polarization and said polarization altering means.

5. The system according to claim 1 wherein said amplifying means comprises a first laser amplifier in the optical path between said beamsplitter and said means responsive to beam polarization and a second laser amplifier in the optical path between said means responsive to beam polarization and said polarization altering means.

6. The system according to claim 1 wherein said amplifying means comprises a first laser amplifier in the optical path between said beamsplitter and said means responsive to beam polarization and a second laser amplifier in the optical path between said means responsive to beam polarization and said beam combiner.

7. The system according to claim 1 wherein said amplifying means comprises a first laser amplifier in the optical path between said means responsive to beam polarization and said polarization altering means and a second laser amplifier in the optical path between said means responsive to beam polarization and said beam combiner.

8. The system according to claim 1 wherein said amplifying means comprises a first laser amplifier in the optical path between said beamsplitter and said means responsive to beam polarization, and a second laser amplifier in the optical path between said means responsive to beam polarization and said polarization altering means, and a third laser amplifier in the optical path between said means responsive to beam polarization and said beam combiner.

9. The system according to claim 1 wherein said amplifying means comprises a laser amplifier in the optical path between said polarization altering means and said target.

10. The system according to claim 1 wherein said amplifying means comprises a first laser amplifier in the optical path between said beamsplitter and said means responsive to beam polarization and a second laser amplifier in the optical path between said polarization altering means and said target.

11. The system according to claim 1 wherein said amplifying means comprises a first laser amplifier in the optical path between said polarization altering means and said target and a second laser amplifier in the optical path between said means responsive to beam polarization and said beam combiner.

12. The system according to claim 1 wherein said amplifying means comprises a first laser amplifier in the optical path between said beamsplitter and said means responsive to beam polarization, and a second laser amplifier in the optical path between said polarization altering means and said target, and a third laser amplifier in the optical path between said means responsive to beam polarization and said beam combiner.

13. The system according to claim 1 wherein said means responsive to beam polarization for transmitting and reflection comprises a Brewster angle polarizer.

14. The system according to claim 1 wherein said polarization altering means comprises a quarter-waveplate.

15. The system according to claim 11 wherein said amplifying means comprises a first laser amplifier in the optical path between said laser and said means responsive to beam polarization and a second laser amplifier in the optical path between said means responsive to beam polarization and said local oscillator generating means.

16. The system according to claim 11 wherein said amplifying means comprises a first laser amplifier in the optical path between said means responsive to beam polarization and said local oscillator generating means and a second laser amplifier in the optical path between said means responsive to beam polarization and said detector.

17. The system according to claim 11 wherein said amplifying means comprises a first laser amplifier in the optical path between said laser and said means responsive to beam polarization, and a second laser amplifier in the optical path between said means responsive to beam polarization and said local oscillator generating means, and a third laser amplifier in the optical path between said means responsive to beam polarization and said detector.

18. A laser radar system for transmitting an optical beam toward a target and for detecting the target-reflected portion of said beam, said system including:
- a laser for producing a beam of optical energy along a first path;
- local oscillator generating means in said first path, said local oscillator generating means for altering the polarization of an optical beam passing therethrough, said local oscillator generating means additionally reflecting a portion of said beam from said laser;
- means in said first path responsive to the polarization of said beam from said laser for transmitting said beam from said laser therethrough, and responsive to the polarization of said target-reflected beam altered by said local oscillator generating means for reflecting said target-reflected portion along a second path, and responsive also to the polarization of said beam portion reflected by said local oscillator generating means for reflecting said reflected beam portion along said second path;
- detector means responsive to said beam on said second path; and
- means in at least one of said first and second paths for amplifying the optical energy in said at least one path.

19. The system according to claim 18 wherein said amplifying means comprises a laser amplifier in the optical path between said laser and said means responsive to beam polarization.

20. The system according to claim 18 wherein said amplifying means comprises a laser amplifier in the optical path between said local oscillator generating means and said target.

21. The system according to claim 18 wherein said amplifying means comprises a laser amplifier in the optical path between said means responsive to beam polarization and said detector.

22. The system according to claim 18 wherein said amplifying means comprises a first laser amplifier in the optical path between said laser and said means responsive to beam polarization and a second laser amplifier in the optical path between said local oscillator generating means and said target.

23. The system according to claim 18 wherein said amplifying means comprises a first laser amplifier in the optical path between said laser and said means responsive to beam polarization and a second laser amplifier in the optical path between said means responsive to beam polarization and said detector.

24. The system according to claim 18 wherein said amplifying means comprises a first laser amplifier in the optical path between said local oscillator generating means and said target and a second laser amplifier in the optical path between said means responsive to beam polarization and said detector.

25. The system according to claim 18 wherein said amplifying means comprises a first laser amplifier in the optical path between said laser and said means responsive to beam polarization, and a second laser amplifier in the optical path between said local oscillator generating means and said target, and a third laser amplifier in the optical path between said means responsive to beam polarization and said detector.

26. The system according to claim 18 wherein said amplifying means comprises a laser amplifier in the optical path between said means responsive to beam polarization and said local oscillator generating means.

27. The system according to claim 18 wherein said means responsive to beam polarization comprises a polarizing beamsplitter.

* * * * *